United States Patent [19]

Wrenn

[11] Patent Number: 4,960,356
[45] Date of Patent: Oct. 2, 1990

[54] JET PROPELLED WATERCRAFT LOADING AND STORING APPARATUS

[75] Inventor: Bruce E. Wrenn, Roxboro, N.C.

[73] Assignee: Personal Watercraft Creations, Inc., Roxboro, N.C.

[21] Appl. No.: 442,662

[22] Filed: Nov. 29, 1989

[51] Int. Cl.⁵ ............................................. B65G 67/02
[52] U.S. Cl. ................................... 414/537; 414/462; 414/373; 414/572; 280/414.1; 114/344; 402/2
[58] Field of Search ............... 414/537, 538, 462, 678, 414/401, 373, 522, 572; 280/414.1, 414.2, 414.3; 114/344; 405/2

[56] References Cited

U.S. PATENT DOCUMENTS

| | | | |
|---|---|---|---|
| 3,717,356 | 2/1973 | Haberthier | 280/414.1 |
| 3,822,899 | 7/1974 | Slack | 280/414.1 |
| 4,681,334 | 7/1987 | O'Brien, Jr. | 280/414.1 |
| 4,745,873 | 5/1988 | Mott | 114/344 |

FOREIGN PATENT DOCUMENTS 1305164  8/1962  France ............................. 280/414.1
525575  8/1976  U.S.S.R. ............................. 114/344

*Primary Examiner*—Frank E. Werner
*Attorney, Agent, or Firm*—Olive & Olive

[57] ABSTRACT

An apparatus for loading, unloading and storing a jet propelled water vehicle comprising a first pair of tubes made of relatively smooth surfaced plastic plumbing pipe or the like, a second pair of tubes of similar construction which telescope within and extend from the first pair of tubes and devices to adjustably support and space the first pair of tubes on a truck bed, mini-van floor, trailer frame, elevated rack or the like. When the first pair of tubes are mounted in a pickup truck bed for example and the second pair of tubes are drawn out as an extension of the first pair of tubes, a jet propelled vehicle can be loaded directly from the water by applying the weight of the vehicle to bend the second pair of tubes and after a short jet burst propelling the vehicle along the tubes with the grooves in the hull of the vehicle engaging the tubes. In another mode the vehicle slides on the tubes onto a storage rack directly from the water or from the bed of a pickup truck or the like.

6 Claims, 8 Drawing Sheets

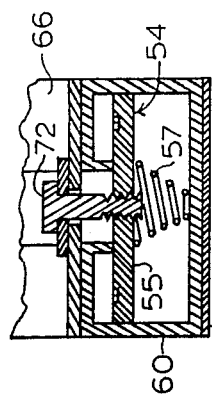
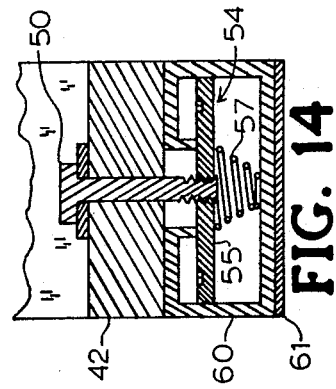
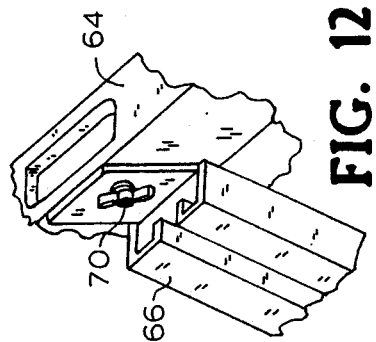
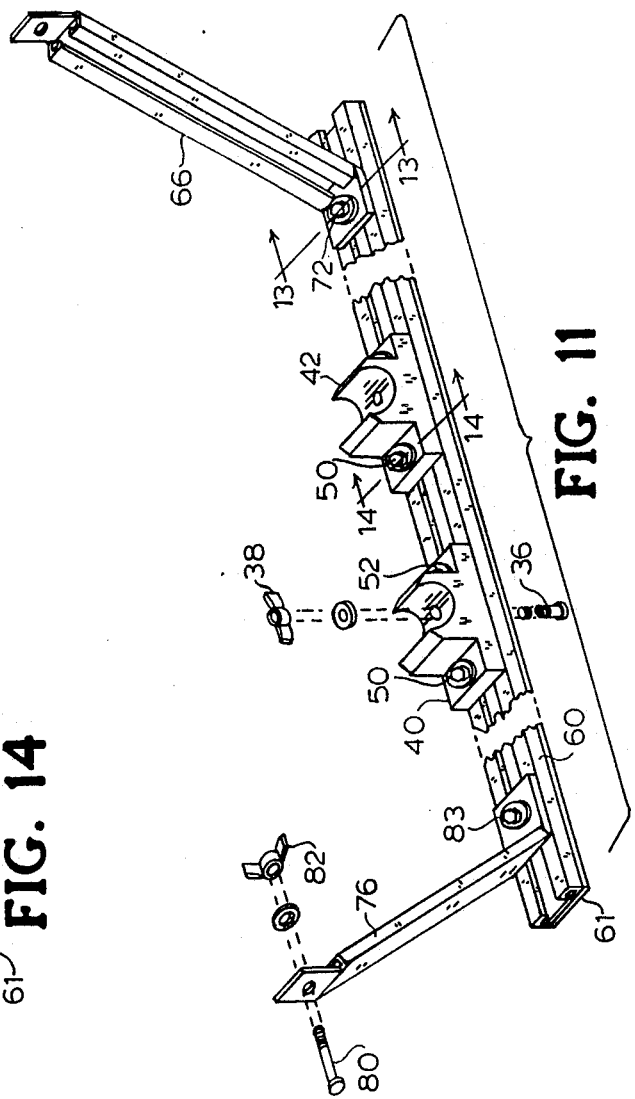

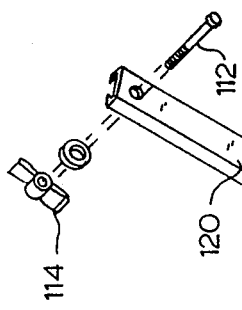
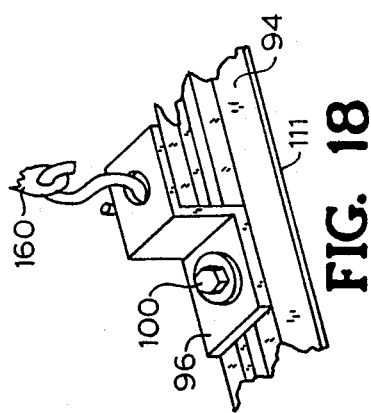
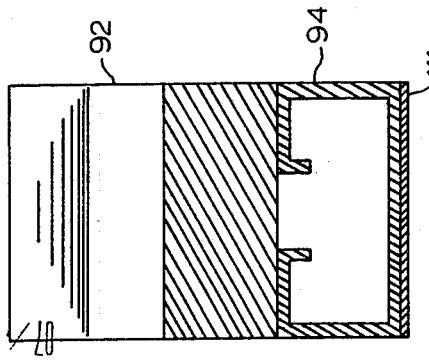
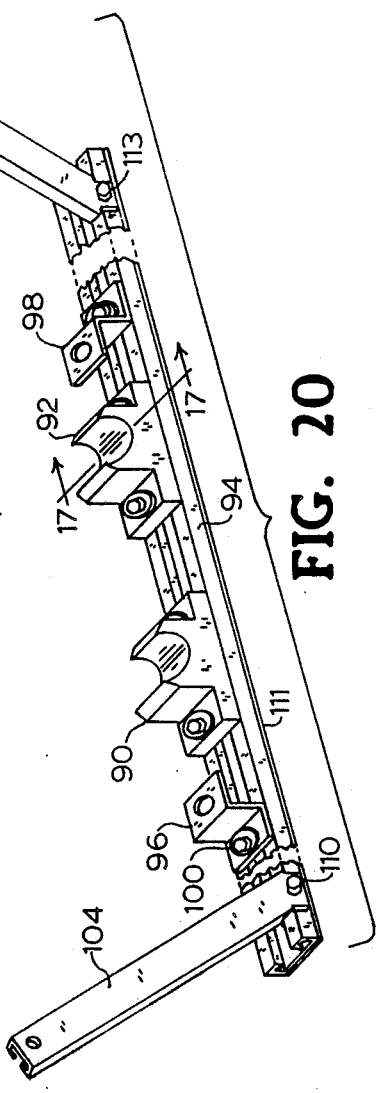
FIG. 17
FIG. 18
FIG. 20

JET PROPELLED WATERCRAFT LOADING AND STORING APPARATUS

BACKGROUND OF INVENTION

1. Field Of The Invention

The invention relates to an apparatus for loading, unloading and storing a jet propelled type recreational vehicle such as the popular Jet Ski watercraft.

2. Background Art

The popular Jet Ski watercraft is heavy and is difficult to load and unload without two or more people. Consequently, recreational vehicles of this type are often loaded on and unloaded from a trailer which is backed into the water typically on a ramp. The trailer is often towed by a pickup truck, a mini-van or the like, in the bed of which the fuel and related gear is stowed. Thus, it would be desirable to have an apparatus enabling one person to load and unload the watercraft directly onto the bed of a pickup truck, a mini-van or the like and the provision of such an apparatus becomes the principal object of the invention. A pickup truck will be referred to hereafter by way of example though the invention readily adapts to other types of vehicles used to transport such watercraft.

Another need when using a jet propelled watercraft such as the popular Jet Ski vehicle is that of being able to store the water vehicle on a suitable rack in a garage, in a storage yard or the like when the vehicle is not in use. It would thus also be desirable to have a storage rack onto which the water vehicle could be easily moved by one person directly from and onto the bed of a pickup truck. Another object is that of providing such a storage rack with components designed to cooperate with those components primarily used for loading onto and from a pickup truck bed.

A final need exists when the owner of the Jet Ski type vehicle already owns a trailer and desires to be able himself to load his water vehicle onto and from the trailer without requiring the assistance of another person. The provision of such a trailer loading and unloading apparatus also becomes an object of the invention. Other objects will become apparent as the description proceeds.

SUMMARY OF THE INVENTION

A first pair of parallel pipes with relatively smooth, low friction surfaces are arranged to be adjustably spaced to conform with the hull width of a jet propelled watercraft such as the popular Jet Ski vehicle. The pipes are secured at their leading end to the front end of a pickup truck bed, mini-van floor or the like. A second pair of bendable, parallel pipes telescope within the first pair and are pulled out to extend into the water when the Jet Ski vehicle is being loaded. The vehicle weight bends the tubes which provide smooth, low friction tracks on which the vehicle moves into the truck bed after the operator briefly operates the jets. Unloading involves simply sliding the vehicle backwards on the tracks whose low friction enables this to be easily accomplished by the operator alone.

In another embodiment, the described truck loading apparatus is aligned with an elevated rack designed to support the mentioned second pair of pipes such that the vehicle can be readily slid from the truck bed for storage or back onto the vehicle and into the water when placed back in use.

There is also described an embodiment in which the described invention apparatus enables the Jet Ski or like watercraft to be loaded onto and from a trailer backed into or near the water.

Since the Jet Ski vehicle is normally formed with a tri-hull type of construction, advantage is taken of using the pair of parallel underside grooves in the hull to guide the vehicle when riding on the pipe structure of the invention. Also, by using plumbing type plastic tubes, a low friction surface is presented for sliding the vehicle and which can be enhanced by use of a Teflon spray, WD-40 spray or similar lubricant designed to reduce friction between one surface sliding on another.

DESCRIPTION OF DRAWINGS

FIG. 11 is a perspective view of the support block assembly seen in FIG. 3 and which is used for securing the pipes at the front end of the truck bed.

FIG. 12 is a fragmentary perspective view showing the manner in which the FIG. 11 assembly is secured to an upright strut forming part of the truck body.

FIG. 13 is a sectional view taken along line 13—13 in FIG. 11 illustrating how the adjustable nut-spring assembly of FIGS. 5–6 secure the support arms forming part of the FIG. 11 assembly.

FIG. 14 is a sectional view taken along line 14—14 in FIG. 11 illustrating the nut-spring assembly of FIGS. 5–6 securing the support block of FIG. 4.

FIG. 17 is a sectional view taken along line 17—17 in FIG. 20 illustrating how the support block is secured for adjustable positioning.

FIG. 18 is a perspective view of an adjustable clamp used to anchor one end of a strap employed to secure the watercraft.

FIG. 20 is a fragmentary perspective view showing the rear block support assembly which is attached to the truck body, not shown, and with one of the fasteners eliminated for purpose of illustration.

DESCRIPTION OF PREFERRED EMBODIMENT

Three embodiments of the invention apparatus are illustrated all of which depend on certain of the same components. In a first and principal embodiment, the invention apparatus as in FIG. 2 permits loading from the water to a truck bed or from the truck bed to the water. In a second embodiment, the invention apparatus permits loading and unloading between a truck bed and a rack as in FIGS. 9 and 10 or between the rack and water or ground level as in FIG. 16. In a third embodiment, the invention apparatus permits loading and unloading between a trailer and the water as in FIG. 21.

In all embodiments, the pair of lengthwise extending parallel grooves 37, 39 (FIG. 19) characteristic of the hull of the watercraft W such as the Jet Ski vehicle engage and ride on pairs of round pipes formed of plastic or other material providing a relatively low friction surface and whose friction can be further reduced by use of a Teflon spray, so called WD-40 spray or a similar lubricant. Because of this low friction it now becomes possible for one person to load or unload from a truck, a rack or trailer as later described and illustrated.

Figure 1:
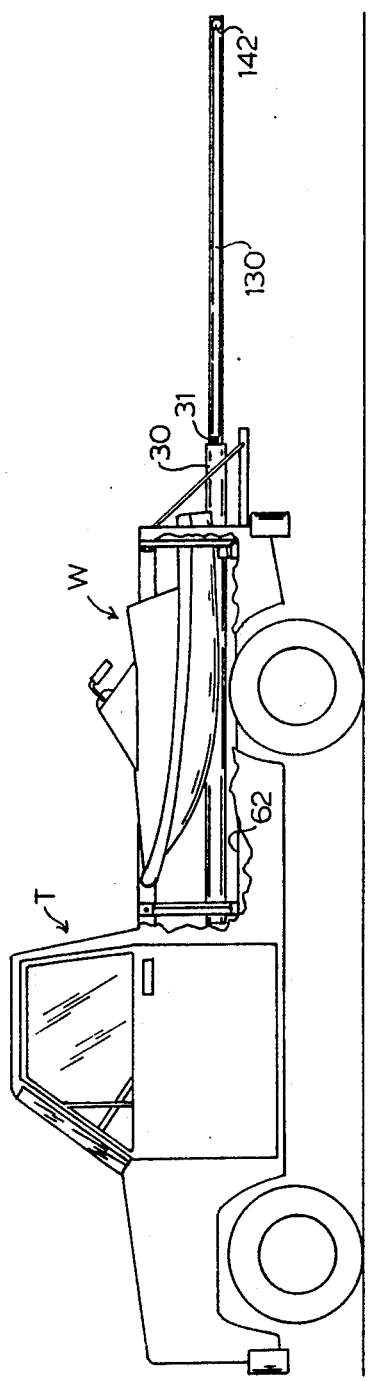
FIG. 1 is an elevation view illustrating a jet watercraft loaded on a pickup truck bed with the invention apparatus positioned for unloading the watercraft.
Figure 4:
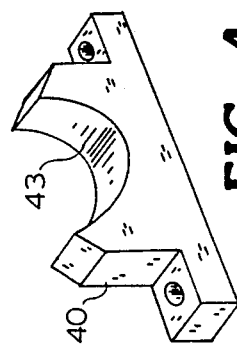
FIG. 4 is a perspective view of a pipe support block forming part of the invention apparatus.
Figure 15:
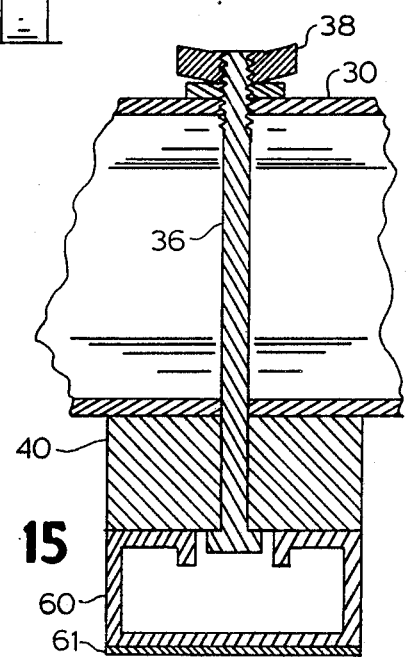
FIG. 15 is a sectional view taken along line 15—15 in FIG. 3 illustrating how the front end of the pipes are adjustably secured.

Making reference initially to the first embodiment, a pair of round, plastic, plumbing pipes 30, 32 are secured at their leading ends by bolts 36 (FIG. 15), and wing nuts 38 to a pair of molded or otherwise suitably formed front support blocks 40, 42 with pipe rest surfaces 43 (FIG. 4). Blocks 40, 42 are each adjustably secured by a pair of bolts 50, 52 (FIG. 11) which thread into adjustable nut-spring assemblies 54 each formed of a threaded plate 55 and a spring 57. An assembly of the type sold as a Uni-Strut nut is suitable for the purpose. The nut-spring assemblies 54 slide in a metal channel 60 which bolts to the floor 62 of the truck bed of truck T (FIG. 1) being used by way of example. A right brace 66 (FIG. 3) is secured at its upper end to a formed channel 68 forming part of the truck bed by means of bolt 70 and at its lower end by a bolt 72 secured to a nut-spring assembly (not shown). A left brace 76 (FIG. 3) is secured at its upper end to a similar formed channel, not shown, by means of bolt 80 and wing nut 82 (FIG. 11) and at its lower end by a bolt 83 secured to a nut-spring assembly (not shown). It will be understood that the spacing S between pipes 30, 32 is adjusted by suitable adjustment of front support blocks 40, 42.

Figure 19:
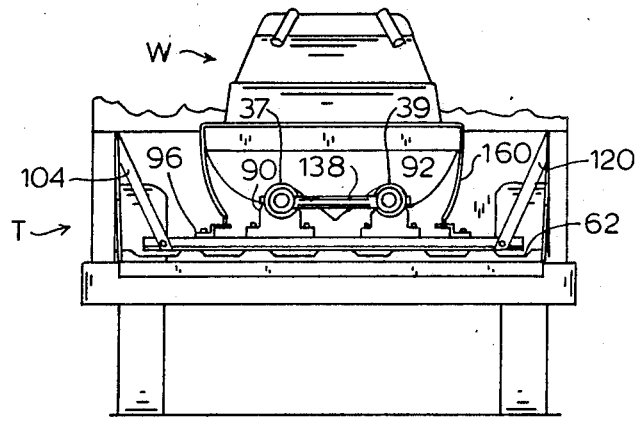
FIG. 19 is a rear view of a watercraft loaded and secured on a truck while resting on the invention apparatus.

The rear or trailing end of pipes 30, 32 are supported on rear support blocks 90, 92 which are adjustably secured to metal channel 94 in the manner previously described. A pair of adjustable clamps 96, 98 are secured by bolts 100 (FIG. 18) and nut-spring assemblies (not shown) which slide in channel 94 as previously described. Clamps 96, 98 receive a securing strap 160 as best illustrated in FIGS. 18 and 19. A left brace 104 (FIG. 3) is secured to truck body channel 94 (FIG. 2) with a bolt and wing nut (not shown). A right brace 120 (FIG. 3) is secured to truck body channel 95 (FIG. 3) in a similar manner utilizing bolt 112 and wing nut 114 seen in FIG. 20.

Figure 3:
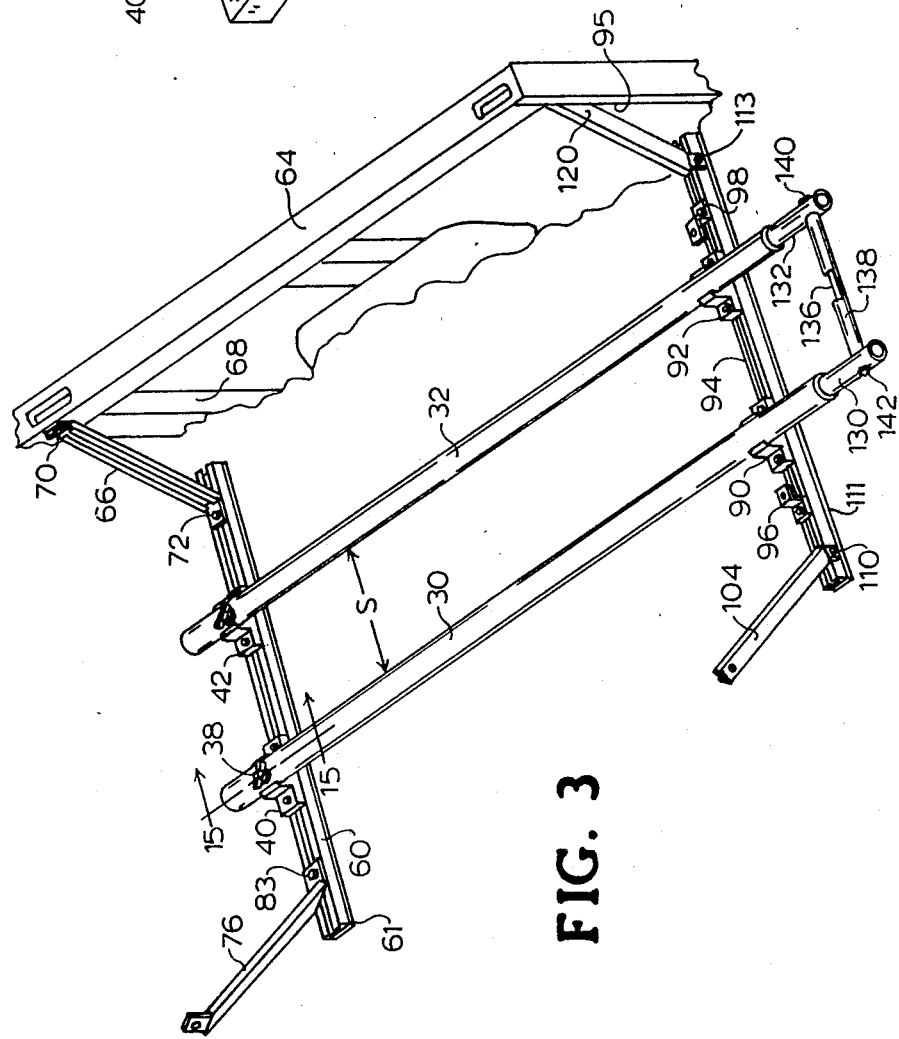
FIG. 3 is a perspective, partially exploded view of the portion of the invention pipe supporting apparatus which is fixed to the truck bed.
Figure 5:
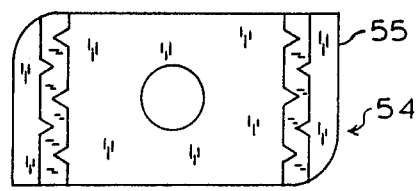
FIG. 5 is a plan view of an adjustable nut-spring assembly used with the support block to permit adjustment of its position.
Figure 6:
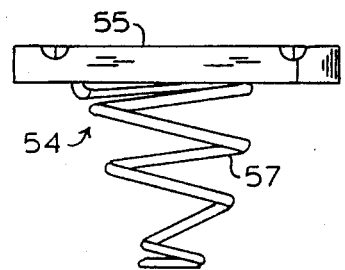
FIG. 6 is a side view of the nut-spring assembly of FIG. 5.

A pair of smaller diameter, bendable, plastic plumbing pipes 130, 132 telescope within pipes 30, 32 and are joined at the trailing ends by means of a rod 136 within a spacer tube 138 and secured by nuts 140, 142. The lengths of rod 136 and spacer tube 138 are selected to correspond with the spacing S of front support blocks 40, 42 and rear support blocks 90, 92. Rubber pads 61 and 111 are used on the lower surfaces of the respective channels 60 and 94 as seen in FIG. 3.

In use, the spacer blocks 40, 42, 90, 92 are properly adjusted and the appropriate length rod 136 and spacer tube 138 is installed to fit the particular jet watercraft designated W in the drawings. Assuming the watercraft W has previously been loaded, the smaller tubes 130, 132 are drawn out as in FIG. 1 to the index mark 31 (FIG. 1) and the watercraft W is slid out of the truck bed onto pipes 130, 132 until the weight of the watercraft W causes the pipes to bend as in FIG. 2 allowing the watercraft to enter the water as shown. This entire operation can be handled by one person.

Figure 2:
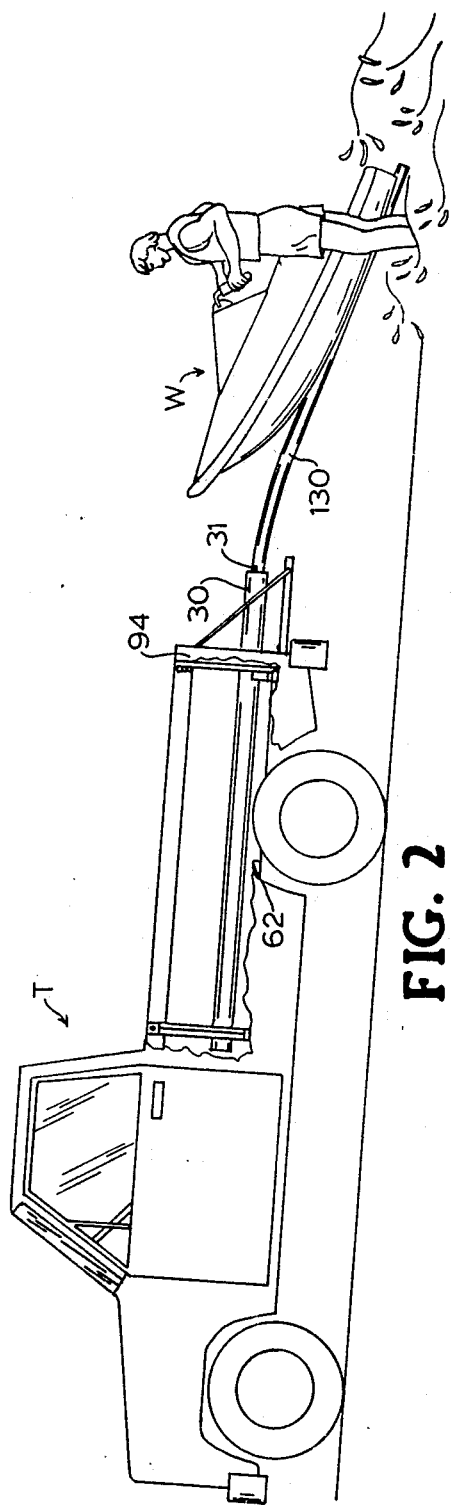
FIG. 2 is an elevation view illustrating the jet watercraft being unloaded from the pickup truck bed into the water utilizing the weight of the watercraft to bend the invention apparatus, this view also representing how the watercraft would be loaded onto the truck bed from the water.

In a reverse operation, the watercraft W can be lined up onto the pipes 130, 132 as in FIG. 2 and with a brief application of jet propulsion, the watercraft W can be made to slide up the pipes 130, 132 under its own power and onto pipes 30, 32. At this time the smaller pipes 30, 32 can be stored in the larger pipes 130, 132 for travel and a suitable strap 160 (FIG. 19) used to secure the watercraft W to the bed of the truck. The ends of strap 160 are secured to the previously described adjustable clamps 96, 98 (FIGS. 3 and 18).

Figure 7:
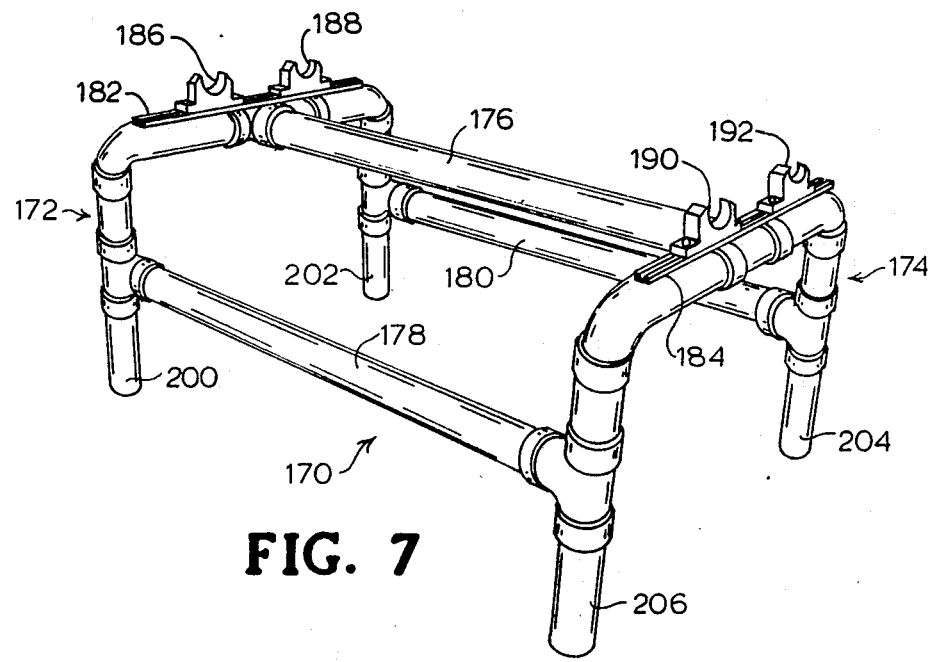
FIG. 7 is a perspective view of a rack adapted to receive the pipe structure of the invention for supporting the watercraft when not in use.

Making reference next to FIG. 7 and the second embodiment, a rack 170 comprises a pair of inverted U-shaped legs 172, 174 joined by a top pipe member 176 and side pipes 178, 180 utilizing conventional plastic plumbing pipe and fittings joined by a suitable adhesive. A pair of metal channels 182, 184 of the type previously described mount adjustable pipe support blocks 186, 188, 190, 192 which are adjustably secured by nut-spring assemblies, not shown, as previously described.

Figure 9:
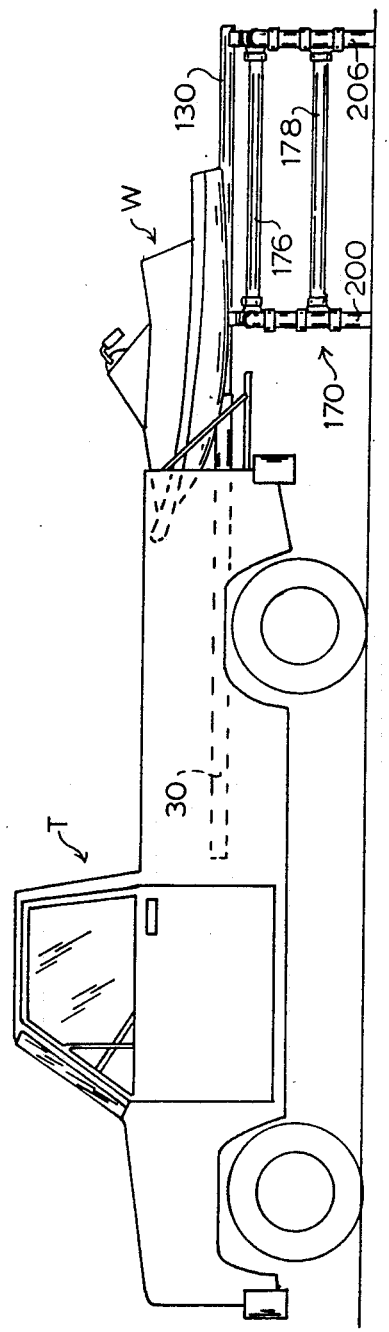
FIG. 9 is a side view showing the watercraft being loaded onto the rack of FIG. 7 utilizing the previously referred to loading/unloading apparatus of the invention.
Figure 10:
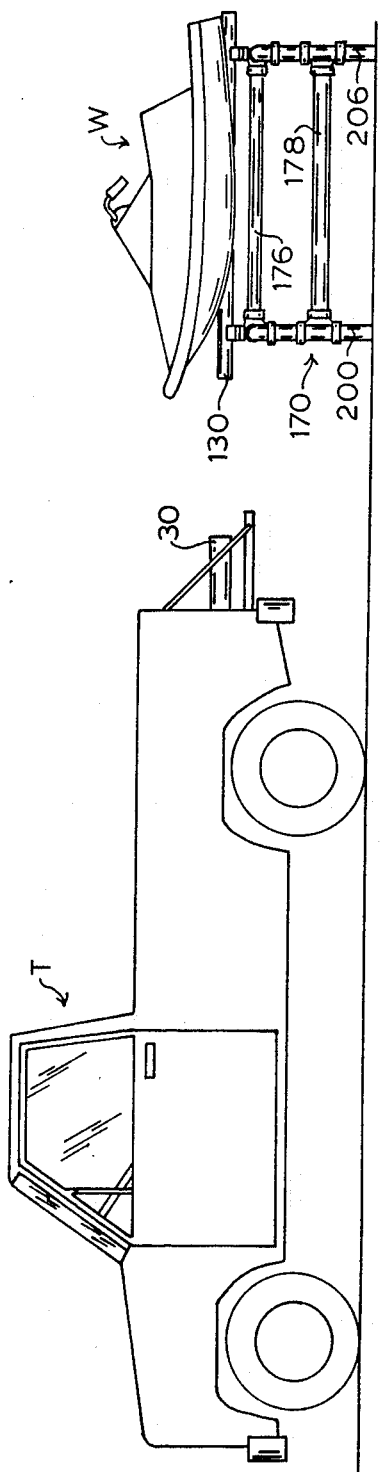
FIG. 10 is a side view showing the watercraft loaded onto and stored on the rack and the truck pulled away from the rack.

In a first mode of use illustrated in FIGS. 9 and 10, rack 170 is brought up close to the rear of the truck T fitted with the loading/unloading apparatus of the invention. The smaller set of pipes 130, 132 are drawn out to rest in the support blocks 186, 188, 190, 192 and the watercraft W is slid out from the truck bed as in FIG. 9 to rest on the rack 170 for storage as in FIG. 10. In this mode of use there is little tendency for tipping due to the weight of the watercraft W and the legs of rack 170 do not normally need to be embedded in the ground or otherwise anchored nor do the pipes resting on rack 170 require anchoring to rack 170.

Figure 8:
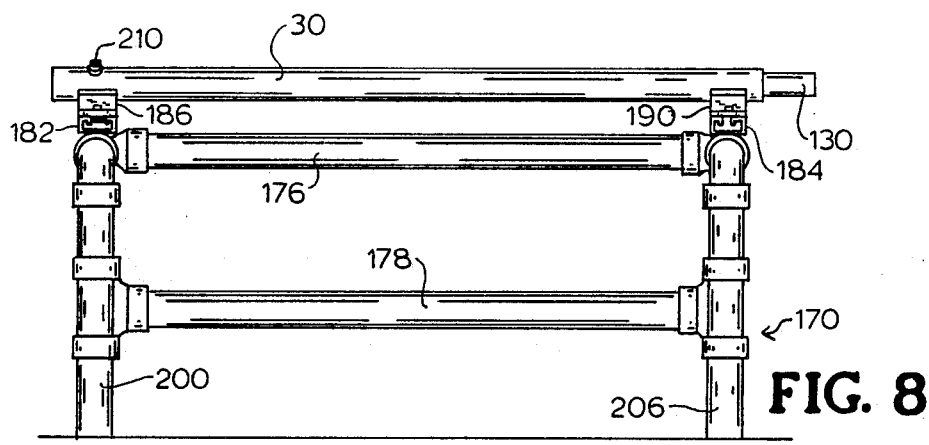
FIG. 8 is an elevation view with the watercraft not shown but with the watercraft supporting pipes in position on the rack preparatory to supporting the watercraft thereon.
Figure 16:
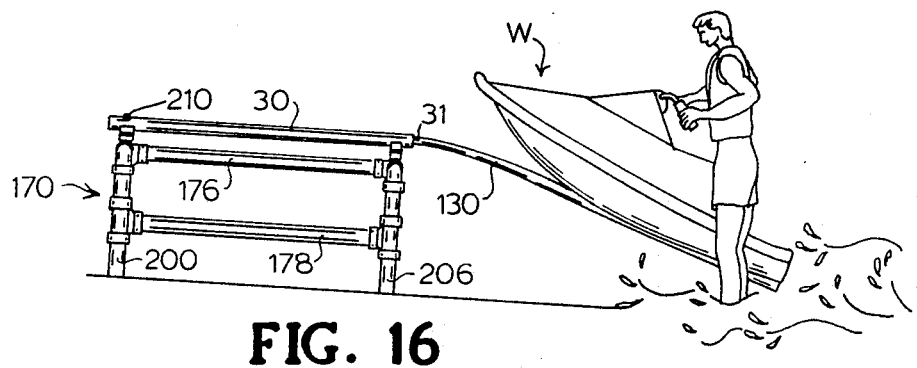
FIG. 16 is an elevation view illustrating the invention apparatus loading a watercraft directly from the water onto the rack of FIG. 8.

In another mode of use, the legs 200, 202, 204, 206 (FIG. 7) are embedded in the ground with concrete or other anchoring means next, for example, to a body of water as in FIG. 16. The larger size pipes 30, 32 are secured at one end by bolts 210 (FIG. 8) to the respective support blocks 186, 188 with the opposite ends of the pipes resting in support blocks 190, 192. The smaller size pipes 130, 132 are then drawn out to the index mark 31 and bent downwardly by the weight of the watercraft W as in FIG. 16 and the watercraft is briefly jet propelled sufficient to cause it to slid up the pipes 130, 132 onto the pipes 30, 32 where it may rest in storage as in the previously referred to FIG. 10.

Figure 21:
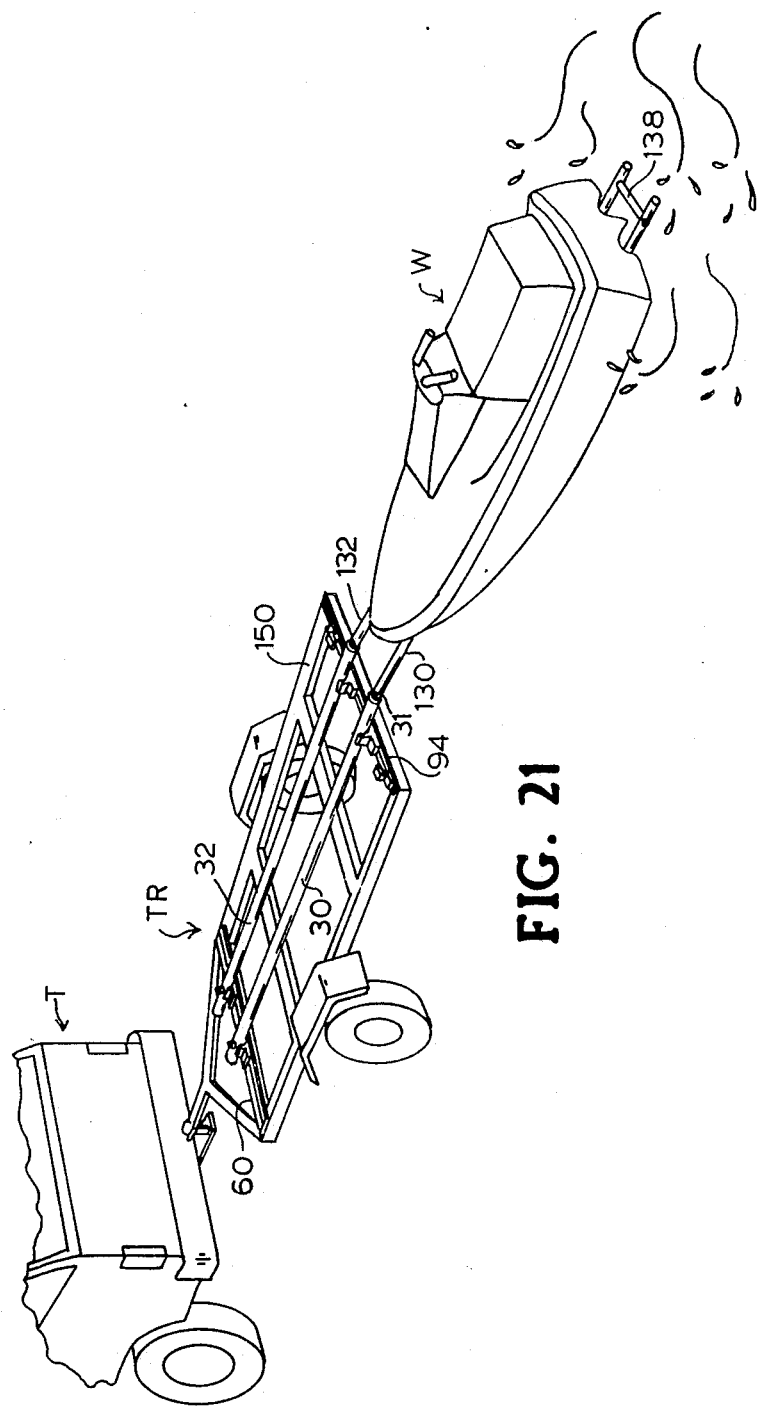
FIG. 21 is a perspective view of the invention apparatus being used to load a jet propelled watercraft onto a trailer.

To further illustrate the versatility of the invention, a portion of the previously described apparatus is shown fitted to a trailer TR in FIG. 21. In this regard, the previously referred to metal channels 60, 94 are appropriately secured to the trailer frame 150. Pipes 30, 32 are secured as previously described in reference to FIG. 3 and rest in the adjustable front blocks 40, 42 and adjustable rear blocks 90, 92 as previously described. In use, the watercraft W straddles the pipes 130, 132 which bend under the weight of the watercraft W. Loading is completed by a short burst of jet propulsion which loads the watercraft W onto the trailer TR.

From the foregoing it can be seen that loading and unloading can be accomplished by one person acting alone either to and from a truck bed, mini-van or the like or a rack located in a garage or storage yard.

What is claimed is:

1. An apparatus for loading, unloading and storing a jet propelled water vehicle of the type having a pair of parallel grooves formed in its hull and extending for substantially the length thereof comprising:

(a) a first pair of horizontal parallel hollow tubes having substantially smooth external surfaces and of a shape and size suited to serving as supporting tracks for sliding the jet propelled water vehicle thereon between leading and trailing ends thereof with the hull grooves thereof resting on said tubes;

(b) a second pair of parallel hollow tubes having substantially smooth external surfaces slidably mounted within said first pair of tubes and extendable therefrom to provide an extension of the supporting tracks formed by said first pair of tubes, said second pair of tubes having leading and trailing ends and in one mode being bendable such that when the leading ends of each of the second pair of tubes are nested in respective trailing ends of said first pair of tubes, said second pair of tubes tend to bend when the weight of the jet propelled water vehicle is received by the trailing ends of said second pair of tubes in transferring the vehicle from the second to the first pair of tubes and in another mode when said second pair of tubes rest on a support located at substantially the same elevation as said first pair of tubes, said second pair of tubes provide horizontal supporting tracks for storing said vehicle;

(c) first support means for adjustably spacing and supporting the said leading and trailing ends of said first pair of tubes; and (d) spacer means joining the trailing ends of said second pair of tubes and operative to maintain said trailing ends of said second pair of tubes spaced apart a distance substantially equal to the distance said first pair of tubes are spaced apart and mating the spacing of the hull grooves of the vehicle to be transported thereon.

2. An apparatus for loading, unloading and storing a jet propelled vehicle as claimed in claim 1 including means detachably mounting said first support means in the bed of a second vehicle used for transporting said jet propelled vehicle.

3. An apparatus for loading, unloading and storing a jet propelled vehicle as claimed in claim 1 including a rack providing an elevated support and means detachably mounting said first support means on said elevated support.

4. An apparatus for loading, unloading and storing a jet propelled vehicle as claimed in claim 1 including means detachably mounting said first support means on a trailer frame forming part of a trailer towed by a second vehicle.

5. An apparatus for loading, unloading and storing a jet propelled vehicle as claimed in claim 1 including means detachably mounting said first support means on a second support.

6. An apparatus for loading, unloading and storing a jet propelled vehicle as claimed in claim 1 wherein said first support means includes a first pair of support blocks for supporting and fitted to the shape of the leading ends of said first pair of tubes, a second pair of support blocks for supporting and fitted to the shape of the trailing ends of said first pair of tubes, a first channel for adjustably supporting said first pair of blocks, a second channel for adjustably supporting said second pair of blocks, means for detachably mounting said channels on a second support such as a truck bed, elevated rack, towed trailer or the like and means for adjustably positioning said blocks on said channels.

* * * * *